(12) United States Patent
Sargent

(10) Patent No.: US 7,734,687 B2
(45) Date of Patent: Jun. 8, 2010

(54) ENVIRONMENT SERVICE ARCHITECTURES FOR NETCENTRIC COMPUTING SYSTEMS

(75) Inventor: Scott R. Sargent, Kenilworth, IL (US)

(73) Assignee: Accenture LLP, San Jose, CA (US)

( * ) Notice: Subject to any disclaimer, the term of this patent is extended or adjusted under 35 U.S.C. 154(b) by 1325 days.

(21) Appl. No.: 11/208,491

(22) Filed: Aug. 22, 2005

(65) Prior Publication Data

US 2005/0283518 A1    Dec. 22, 2005

Related U.S. Application Data

(63) Continuation of application No. 09/676,580, filed on Sep. 29, 2000, now abandoned.

(60) Provisional application No. 60/156,962, filed on Oct. 1, 1999.

(51) Int. Cl.
*G06F 15/16* (2006.01)

(52) U.S. Cl. ...................................................... 709/203
(58) Field of Classification Search ................. 709/203; 719/313–319
See application file for complete search history.

(56) References Cited

U.S. PATENT DOCUMENTS

| | | | |
|---|---|---|---|
| 4,809,170 A | 2/1989 | Leblang et al. ............. | 364/200 |
| 5,495,610 A | 2/1996 | Shing et al. ................. | 395/600 |
| 5,535,388 A | 7/1996 | Takeda ........................ | 395/650 |
| 5,590,270 A | 12/1996 | Tsukuda ....................... | 395/701 |
| 5,602,997 A | 2/1997 | Carpenter et al. ........... | 395/349 |
| 5,619,716 A | 4/1997 | Nonaka et al. ............... | 395/800 |
| 5,710,915 A | 1/1998 | McElhiney .................. | 395/603 |
| 5,737,533 A | 4/1998 | de Hond ................ | 395/200.49 |
| 5,742,829 A | 4/1998 | Davis et al. ................. | 395/712 |
| 5,745,753 A | 4/1998 | Mosher, Jr. .................. | 395/618 |

(Continued)

FOREIGN PATENT DOCUMENTS

| | | |
|---|---|---|
| EP | 0520923 A2 | 12/1992 |
| EP | 0697655 A2 | 2/1996 |

(Continued)

OTHER PUBLICATIONS

Orfali, R., Harkey, D., "Client/Server Programming with OS/2 2.0 (2nd Ed.)" 1992, Van Nostrand Reinhold New York, U.S., pp. 10-24, 111-137, 149-160, 588-594, XP002164217, ISBN 0-442-01219-5.

(Continued)

*Primary Examiner*—Larry Donaghue
(74) *Attorney, Agent, or Firm*—Brinks Hofer Gilson & Lione

(57) ABSTRACT

An environment services architecture for a netcentric computing system is disclosed by the present invention. The environment services architecture includes runtime services for converting non-compiled computer languages into machine code during the execution of an application on the netcentric computing system. System services perform system-level functions in the netcentric computing system are also provided that may be selected from the group consisting of system security services, profile management services, task and memory management services and environment verification services. In addition, the environment services architecture also includes application services for performing common functions in the netcentric computing system. A component framework service provides components of the netcentric computing system with a standard infrastructure for allowing an application running on components to communicate within and across applications in the netcentric computing system. Further, operating system services are provided for providing the netcentric computing system with underlying basic computing services.

42 Claims, 3 Drawing Sheets

U.S. PATENT DOCUMENTS

| | | | | |
|---|---|---|---|---|
| 5,758,150 | A | 5/1998 | Bell et al. | 395/610 |
| 5,761,071 | A | 6/1998 | Bernstein et al. | 364/479.07 |
| 5,781,732 | A | 7/1998 | Adams | 395/200.35 |
| 5,799,297 | A | 8/1998 | Goodridge et al. | 707/1 |
| 5,805,785 | A | 9/1998 | Dias et al. | 395/182.02 |
| 5,835,090 | A | 11/1998 | Clark et al. | 345/339 |
| 5,859,969 | A | 1/1999 | Oki et al. | 395/200.3 |
| 5,860,012 | A | 1/1999 | Luu | 395/712 |
| 5,870,759 | A | 2/1999 | Bauer et al. | 707/201 |
| 5,877,759 | A | 3/1999 | Bauer | 345/339 |
| 5,892,905 | A | 4/1999 | Brandt et al. | 395/187.01 |
| 5,892,909 | A | 4/1999 | Grasso et al. | 395/200.31 |
| 5,905,868 | A | 5/1999 | Baghai et al. | 395/200.54 |
| 5,911,071 | A | 6/1999 | Jordan | 395/701 |
| 5,924,096 | A | 7/1999 | Draper et al. | 707/10 |
| 5,930,512 | A | 7/1999 | Boden et al. | 395/710 |
| 5,933,582 | A | 8/1999 | Yamada | 395/114 |
| 5,956,400 | A | 9/1999 | Chaum et al. | 713/167 |
| 5,956,479 | A | 9/1999 | McInerney et al. | 395/183.14 |
| 5,999,931 | A | 12/1999 | Breitbart et al. | 707/10 |
| 6,006,171 | A | 12/1999 | Vines et al. | 702/184 |
| 6,012,071 | A | 1/2000 | Krishna et al. | 707/522 |
| 6,023,698 | A | 2/2000 | Lavey, Jr. et al. | 707/10 |
| 6,029,192 | A | 2/2000 | Hill et al. | 709/206 |
| 6,038,560 | A | 3/2000 | Wical | 707/5 |
| 6,061,695 | A | 5/2000 | Slivka et al. | 707/513 |
| 6,067,577 | A | 5/2000 | Beard | 709/305 |
| 6,081,518 | A | 6/2000 | Bowman-Amuah | 370/352 |
| 6,112,304 | A | 8/2000 | Clawson | 713/156 |
| 6,122,630 | A | 9/2000 | Strickler et al. | 707/8 |
| 6,144,975 | A | 11/2000 | Harris, Jr. et al. | 707/901 |
| 6,147,975 | A | 11/2000 | Bowman-Amuah | 370/252 |
| 6,157,706 | A | 12/2000 | Rachelson | 379/100.08 |
| 6,185,573 | B1 | 2/2001 | Angelucci et al. | 707/104 |
| 6,195,697 | B1 | 2/2001 | Bowman-Amuah | 709/224 |
| 6,256,773 | B1 | 7/2001 | Bowman-Amuah | 717/1 |
| 6,289,382 | B1 | 9/2001 | Bowman-Amuah | 709/226 |
| 6,321,263 | B1 | 11/2001 | Luzzi et al. | 709/224 |
| 6,324,647 | B1 | 11/2001 | Bowman-Amuah | 713/201 |
| 6,332,163 | B1 | 12/2001 | Bowman-Amuah | 709/231 |
| 6,339,832 | B1 | 1/2002 | Bowman-Amuah | 714/35 |
| 6,345,239 | B1 | 2/2002 | Bowman-Amuah | 703/6 |
| 6,366,912 | B1 | 4/2002 | Wallent et al. | 709/9 |
| 6,370,573 | B1 | 4/2002 | Bowman-Amuah | 709/223 |
| 6,385,655 | B1 | 5/2002 | Smith et al. | 709/232 |
| 6,401,097 | B1 | 6/2002 | McCotter et al. | 707/102 |
| 6,405,364 | B1 | 6/2002 | Bowman-Amuah | 717/101 |
| 6,418,430 | B1 | 7/2002 | DeFazio et al. | 707/3 |
| 6,426,948 | B1 | 7/2002 | Bowman-Amuah | 370/260 |
| 6,427,132 | B1 | 7/2002 | Bowman-Amuah | 703/22 |
| 6,434,568 | B1 | 8/2002 | Bowman-Amuah | 707/103 |
| 6,434,628 | B1 | 8/2002 | Bowman-Amuah | 709/303 |
| 6,438,594 | B1 | 8/2002 | Bowman-Amuah | 709/225 |
| 6,442,547 | B1 | 8/2002 | Bowman-Amuah | 707/10 |
| 6,442,748 | B1 | 8/2002 | Bowman-Amuah | 717/3 |
| 6,449,588 | B1 | 9/2002 | Bowman-Amuah | 703/21 |
| 6,457,066 | B1 | 9/2002 | Mein et al. | 709/330 |
| 6,477,580 | B1 | 11/2002 | Bowman-Amuah | 709/231 |
| 6,477,665 | B1 | 11/2002 | Bowman-Amuah | 714/39 |
| 6,496,850 | B1 | 12/2002 | Bowman-Amuah | 709/203 |
| 6,502,213 | B1 | 12/2002 | Bowman-Amuah | 714/49 |
| 6,523,027 | B1 | 2/2003 | Underwood | 707/4 |
| 6,529,909 | B1 | 3/2003 | Bowman-Amuah | 707/10 |
| 6,529,948 | B1 | 3/2003 | Bowman-Amuah | 709/217 |
| 6,539,396 | B1 | 3/2003 | Bowman-Amuah | 707/103 |
| 6,542,593 | B1 | 4/2003 | Bowman-Amuah | 379/201.03 |
| 6,549,949 | B1 | 4/2003 | Bowman-Amuah | 709/236 |
| 6,550,057 | B1 | 4/2003 | Bowman-Amuah | 717/126 |
| 6,556,659 | B1 | 4/2003 | Bowman-Amuah | 379/9.04 |
| 6,571,282 | B1 | 5/2003 | Bowman-Amuah | 709/219 |
| 6,578,068 | B1 | 6/2003 | Bowman-Amuah | 709/203 |
| 6,584,466 | B1 | 6/2003 | Serbinis et al. | 707/10 |
| 6,598,046 | B1 | 7/2003 | Goldberg et al. | 707/5 |
| 6,601,192 | B1 | 7/2003 | Bowman-Amuah | 714/38 |
| 6,601,234 | B1 | 7/2003 | Bowman-Amuah | 717/108 |
| 6,606,660 | B1 | 8/2003 | Bowman-Amuah | 709/227 |
| 6,606,744 | B1 | 8/2003 | Mikurak | 717/174 |
| 6,611,867 | B1 | 8/2003 | Bowman-Amuah | 709/224 |
| 6,615,199 | B1 | 9/2003 | Bowman-Amuah | 706/50 |
| 6,615,253 | B1 | 9/2003 | Bowman-Amuah | 709/219 |
| 6,615,258 | B1 | 9/2003 | Barry et al. | 709/223 |
| 6,636,242 | B2 | 10/2003 | Bowman-Amuah | 345/764 |
| 6,640,238 | B1 | 10/2003 | Bowman-Amuah | 709/201 |
| 6,640,244 | B1 | 10/2003 | Bowman-Amuah | 709/207 |
| 6,640,249 | B1 | 10/2003 | Bowman-Amuah | 709/228 |
| 6,662,357 | B1 | 12/2003 | Bowman-Amuah | 717/120 |
| 6,697,824 | B1 | 2/2004 | Bowman-Amuah | 707/229 |
| 6,704,303 | B1 | 3/2004 | Bowman-Amuah | 370/352 |
| 6,707,812 | B1 | 3/2004 | Bowman-Amuah | 370/353 |
| 6,715,145 | B1 | 3/2004 | Bowman-Amuah | 718/101 |
| 6,721,713 | B1 | 4/2004 | Guheen et al. | 705/1 |
| 6,742,015 | B1 | 5/2004 | Bowman-Amuah | 709/101 |
| 6,745,209 | B2 | 6/2004 | Holenstein et al. | 707/203 |
| 6,874,010 | B1 | 3/2005 | Sargent | 709/203 |
| 6,988,249 | B1 | 1/2006 | Arvanitis et al. | 715/853 |
| 7,020,697 | B1 | 3/2006 | Goodman et al. | 709/223 |
| 7,068,680 | B1 | 6/2006 | Kaltenmark et al. | 370/469 |
| 2001/0052108 | A1 | 12/2001 | Bowman-Amuah | 717/1 |
| 2002/0120553 | A1 | 8/2002 | Bowman-Amuah | 705/37 |
| 2002/0133328 | A1 | 9/2002 | Bowman-Amuah | 703/22 |
| 2003/0058277 | A1 | 3/2003 | Bowman-Amuah | 345/765 |
| 2004/0030705 | A1 | 2/2004 | Bowman-Amuah | 707/100 |
| 2004/0030749 | A1 | 2/2004 | Bowman-Amuah | 709/204 |
| 2004/0107125 | A1 | 6/2004 | Guheen et al. | 705/7 |
| 2005/0080665 | A1 | 4/2005 | Bowman-Amuah | 705/14 |
| 2006/0059253 | A1 | 3/2006 | Goodman et al. | 709/223 |

FOREIGN PATENT DOCUMENTS

| | | |
|---|---|---|
| EP | 0697691 A2 | 2/1996 |
| EP | 0769739 A2 | 4/1997 |
| EP | 0810520 A1 | 12/1997 |
| EP | 0829808 A2 | 3/1998 |
| EP | 0841616 A2 | 5/1998 |
| EP | 0915422 A1 | 5/1999 |
| GB | 2315891 A | 2/1998 |
| WO | WO 92/20022 | 11/1992 |
| WO | WO 95/23373 | 8/1995 |
| WO | WO 97/12311 | 4/1997 |
| WO | WO 98/52121 | 11/1998 |
| WO | WO 98/53396 | 11/1998 |
| WO | WO 98/54660 A2 | 12/1998 |
| WO | WO 98/57260 | 12/1998 |
| WO | WO 99/38079 | 7/1999 |

OTHER PUBLICATIONS

Orfali, R., Harkey, D., Edwards, J., "Intergalactic Client/Server Computing," Byte, McGraw-Hill, Inc., St. Peterborough, U.S., vol. 20, No. 4, Apr. 1, 1995, pp. 108-110, 114, 11, XP000501823, ISSN: 0360-5280.

Smeets, J., Boyer, S., "Internet and Client Server Patent Information Systems: New Services from Derwent," World Patent Information, GB, Elsevier Sciences Publishing, Barking, vol. 20, No. 2, Jun. 1998, pp. 136-139, XP004165804, ISSN 0172-2190.

Orfali, R., Harkey, D., "Client/Server With Distributed Objects," Byte, McGraw-Hill, Inc., St. Peterborough, U.S., vol. 20, No. 4, Apr. 1, 1995, pp. 151-152, 154, 156, XP000501827, ISSN 0360-5280.

Aoyama, M., Hanai, Y., Suzuki, M., "An Integrated Software Maintenance Environment: Bridging Configuration Management and Quality Management," Proceedings of the Conference on Software Maintenance, International Conference on Software Maintenance, Washington, US, IEEE Computer Society Press, Oct. 24, 1988 pp. 40-44.

Borsook, P., "Seeking Security. Mainframe Techniques Define System Security. Soon, they'll be Adapted to Distributed Client/Server Systems." Byte, McGraw-Hill, Inc., St. Peterborough, vol. 18, No. 6, May 1, 1993, pp. 119-122, 124, 12, XP000359327, ISSN 0360-5280.
Tanenbaum, A., "Computer Networks—Third Edition," Prentice-Hall International, London, GB, 1996, pp. 28-39, XP002161723.
Blakeley, J.A., "Universal Data Access with OLE DB," Proceedings of IEEE Compcon, U.S. Los Alamitos, IEEE Computer Society Press, Feb. 23, 1997, pp. 2-7.
IBM Technical Disclosure Bulletin, "Security, License Management and Application Metering Process for Controlling Applications in the DOS Environment," IBM Corp., New York, US, vol. 37, No. 11, pp. 195-199, Nov. 1, 1994.
Voth, G.R., Kindel, C.; Fujioka, J., "Distributed Application Development for Three-Tier Architectures: Microsoft on Windows DNA," IEEE Internet Computing vol. 2, No. 2, Mar./Apr. 1998, USA.
Lambert, N., "A New Patent Search Tool for the Internet. Q-PAT US." Database, US, Cincinnati, vol. 19, No. 4, Aug. 1, 1996.
Abdel-Mottaleb, M., Hsiang-Lung, W., Dimitrova, N., "Aspects of Multimedia Retrieval," Philips Journal of Research, NL, Elsevier, Amsterdam, vol. 50, No. 1, 1996, pp. 227-251.
Olson, M.A., "DataBlade extensions for INFORMIX-Universal Server," Compcon '97 Proceedings, IEEE, 1997, pp. 143-148.
Chamberlin, D.D., "Evolution of Object-Relational Database Technology in DB2," Compcon '97 Proceedings, IEEE, 1997, pp. 131-135.
Nori, A.K., Kumar, S., "Bringing Objects to the Mainstream," Compcon '97 Proceedings, IEEE, 1997, pp. 136-142.
"Data Joiner: A Multidatabase Server Version 1," White Paper, IBM Data Management Solutions, IBM, USA, second edition (May 1995).
"Effective Systems management for DB2 Universal Database," White Paper, IBM Data Management Solutions, IBM, USA, first edition (Dec. 1996).
Pleas, K., "Ole's Missing Links," BYTE, McGraw-Hill Inc., St. Peterborough, US, vol. 21, No. 4, Apr. 1, 1996, pp. 99-102 X-000586036, ISSN 0360-5280.
Burke, M.G., Choi, J.D., Fink, S., Grove, D., Hind, M., Sarkar, V., Serrano, M.J., Sreedhar, V.C., Srinivasan, H., "The Jalapeno Dynamic Optimizing Compiler for Java," Java '99, San Francisco, CA, US, ACM Jun. 12, 1999, pp. 129-141 XP002134655.
Cramer, T., Friedman, R., Miller, T., Seberger, D., Wilson, R., Wolczko, M.,"Compiling Java Just in Time," IEEE Micro, IEEE Inc., New York, US, vol. 17, No. 3, May 1, 1997, pp. 36-43 XP000656035, ISSN: 0272-1732.
Bank, J.S., "Java Security," Dec. 8, 1995, pp. 1-13, X-002092325.
Koved, L., Nadalin, A.J., Neal, D., Lawson, T., "The Evolution of Java Security," IBM, The Ultimate Resource for Java Developers, 1998, pp. 1-14, XP002144222.
Touch, J., Hughes, A.S., "LSAM proxy cache: a multicast distributed virtual cache," Computer Networks and ISDN Systems, North Holland Publishing, Amsterdam, NL (3W3 Workshop, University of Manchester, Jun. 15-17, 1998), vol. 30,No. 22-23, Nov. 25, 1998, pp. 22-23.
Clip, P., "Servlets: CGI The Java Way," BYTE, McGraw-Hill, Inc., St. Peterborough, US, vol. 23, No. 5, May 1, 1998, pp. 55-56.
Gwertzman, J.S., Seltzer, M., "The Case for Geographical Push-Caching," Workshop on Hot Topics in Operating Systems, May 4, 1995, pp. 51-55.
Chamberlin, D.D., "Using the new DB2: IBM's object-relational database system," Morgan Kaufmann Publishers, USA, 1996, ISBN 1-55860-373-5, pp. 561-567.
North, K., "Database Programming with OLE and ActiveX," DBMS, US, M&T Publ., Redwood City, CA, US, Nov. 1996, pp. 1-8.
Joshi, S.M., Veeramani, D., "Book Review. Increasing the Interoperability of CAD Packages. CAD and Office Integration: OLE for Design and Modeling—A New Technology for CA-Software," Computer Aided Design, Elsevier Publishers BV, Barking, GB, vol. 29, No. 12, Dec. 1, 1997, pp. 907.
Schmoll, J. "Wird OLE for Process Control (OPC) Ein Neuer Industriestandard?", Automatisierungstechnische Praxis, ATP, Oldenbourg Verlag, Munchen, DE, vol. 39, No. 5, May 1, 1997, pp. 11-12, 14-17.

Williams, S., Kindel, C., "The Component Object Model. The Foundation for OLE Services," Dr. Dobb's Special Report. Winter, 1994/95, vol. 19, No. 16, Dec. 21, 1994 pp. 14-22.
Smith, D., Tilley, S.R., Weiderman, N. H., "Transforming Legacy Application into Object-Oriented Applications Workshop, Will Net-Centric Computing Change the Reengineering Equation?" 1996, pp. 1-4.
Hamilton, M.A., "Java and the shift to Net-centric computer," Sun Microsystems, Computer, paper published Aug. 1996, ISSN: 0018-9162, Aug. 1996, pp. 31-39.
Copyright Registration for Netcentric Computing: Computing, Communications and knowledge, Reg. Jan. 9, 1998, p. 1.
Kramer, D., The Java™ Platform: A White Paper, JavaSoft, pp. 1-25, May 1996.
www.empowermentzone.com/javacomp.txt, Sun Microsystems, pp. 1-18, 1996.
Raje, R. and Chinnasamy, S., "Designing a distributed computing environment for global scale systems: challenges and issues," ACM SIGAPP Applied Computing Review, vol. 7, Issue 1, Spring 1999, pp. 25-30.
Morris, K.C. and Flater, D., "Standards-based software testing in a Net-Centric World" pp. 1-8.
Engestrom, J., "Software Agents, Towards Transparent Mediation, A Technology Report for Salama Interactive," Jan. 1999, pp. 1-19.
Co-pending U.S. Appl. No. 09/386,917, filed Aug. 31, 1999; 340 pages, Inventor Michael K. Bowman-Amuah.
Co-pending U.S. Appl. No. 09/387,654, filed Aug. 31, 1999; 818 pages, Inventor Michael K. Bowman-Amuah.
Ryan, H.W., Sargent, S.R., Boudreau, T.M., Arvanitis, Y.S., Taylor, S.J., Mindrum, C.; "Practical Guide to Client/Server Computing," Second Ed., pp. 1-774; Copyright 1998, CRC Press LLC, Boca Raton, FL., United States.
Ryan, H.W., Alber, M.W., Taylor, S.J., Change, R.A., Arvanitis, Y.S., Davis, M.C., Mullen, N. K., Dover, S.L., Mehra, P.N., Mindrum, C.; "Netcentric Computing, Computing, Communications and Knowledge," pp. 1-413; Copyright 1998, CRC Press LLC, Boca Raton, FL., United States.
Tilley, S.R., Storey, M.A.D., "Report of the Step '97 Workshop on Net-Centric Computing," Oct., 1997, © Carnegie Mellon University, Pittsburgh, PA.
Lavva, B., Holder, O., Ben-Shaul, I., "Object management for Network centric systems with mobile objects", http://citeseer.ist.psu.edu/update/613778, © Penn State and NEC, printed Dec. 12, 2005.
Farabaugh, B., "Net-Centric Computing: Architecting a Distributed Data Management Infrastructure," http://www.mil-embedded.com/articles/white_papers/farabaugh, printed Dec. 12, 2005.
Cole, B., "What is Net-Centric Computing", Mar. 15, 2001, http://www.embedded.com/showArticle/jhtml?articleID=99000777, © 2005 CMP Media LLC.
Cole, B., XP and net-centric computing, Sep. 14, 2001, http://www.embedded.com/showArticlejhtml?articleID=9900341.
Billy B. L. Lim, "Teaching web development technologies in CS/IS curricula"; ACM, copyright 1998, pp. 107-111.
Litoiu, et al., "A performance engineering tool and method for distributed applications", ACM, pp. 1-14.
Zoller et al., "A toolkit for an automatic, data dictionary based connection of databases to the WWW", ACM, © 1998, pp. 706-718.
McDowell et al., "Unloading Java classes that contain Static fields", ACM, v.33 (1), Oct. 15, 1997, pp. 56-60.
Meisel, P.G., Ito, M.R., Cumming, I.G., "Parallel Synthetic Aperture Radar Processing on Workstation Networks," IEEE, Apr. 15-19, 1996, pp. 1-8.
Schneider, R.D., "Horizontal and Vertical Partitioning," Windows IT Pro, Feb. 1997, 3 pgs. http://www.windowsitpro.com/Windows/Article/ArticleID/98/98.html.
Agrawal, S., Narasayya, V., Yang, B., "Integrating Vertical and Horizontal Partitioning into Automated Physical Database Design," ACM, pp. 359-370, Jun. 13-18, 2004 © 2004 ACM.
U.S. Appl. No. 09/677,134, filed Sep. 29, 2000, Taylor.
U.S. Appl. No. 09/676,584, filed Sep. 29, 2000, Kaltenmark et al.

ENVIRONMENT SERVICE ARCHITECTURES FOR NETCENTRIC COMPUTING SYSTEMS

This application is a continuation of U.S. patent application Ser. No. 09/676,580, filed Sep. 29, 2000 now abandoned which claims the benefit under 35 U.S.C. §119(e) of U.S. provisional application Ser. No. 60/156,962 filed on Oct. 1, 1999, both of which are incorporated herein by reference. In addition, the following commonly owned patents are related to this application: U.S. Pat. No. 7,403,946, issued Jul. 22, 2008, entitled DATA MANAGEMENT FOR NETCENTRIC COMPUTING SYSTEMS; U.S. Pat. No. 6,874,010, issued Mar. 29, 2005, entitled BASE SERVICE ARCHITECTURES FOR NETCENTRIC COMPUTING SYSTEMS; U.S. Pat. No. 6,988,249, issued Jan. 17, 2006, entitled PRESENTATION SERVICE ARCHITECTURES FOR NETCENTRIC COMPUTING SYSTEMS; U.S. Pat. No. 7,020,697, issued Mar. 28, 2006, entitled ARCHITECTURES FOR NETCENTRIC COMPUTING SYSTEMS; U.S. Pat. No. 7,068,680, issued Jun. 27, 2006, entitled COMMUNICATION SERVICE ARCHITECTURES FOR NETCENTRIC COMPUTING SYSTEMS; U.S. Pat. No. 7,467,198, issued Dec. 16, 2008, entitled ARCHITECTURES FOR NETCENTRIC COMPUTING SYSTEMS; and U.S. Pat. No. 7,415,509, issued Aug. 19, 2008, entitled OPERATIONS ARCHITECTURES FOR NETCENTRIC COMPUTING SYSTEMS.

FIELD OF THE INVENTION

The present invention relates generally to business computing systems, and more particularly to environment service architectures for netcentric computing systems.

BACKGROUND OF THE INVENTION

Computer based business solutions have existed for various different types of transactions since the mid-to-late 1960s. During this time period, the technology focused on the use of batch technology. In batch processing, the business user would present a file of transactions to the application. The computer system would then run through the transactions, processing each one, essentially without user intervention. The system would provide reporting at some point in the batch processing. Typically, the reports would be batch printed, which in turn, would be used by the business user to correct the input transactions that were resubmitted along with the next batch of transactions.

In the 1970s, businesses began a transition to on-line, interactive transactions. At a conceptual level, this processing opened up the file of transactions found in batch transactions and allowed the user to submit them one at a time, receiving either immediate confirmation of the success of the transaction or else feedback on the nature of the transaction error. The conceptually simple change of having the user interact with the computer on a transaction-at-a-time basis caused huge changes in the nature of business computing. More important, users saw huge changes in what they could do on a day-to-day basis. Customers were no longer forced to wait for a batch run to process the particular application. In essence, the computer had an impact on the entire work flow of the business user.

Along with the advent of on-line interactive systems, it was equally significant that the systems provided a means for the business user to communicate with others in the business as the day-to-day business went along. This capability was provided on the backbone of a wide area network (WAN). The WAN was in itself a demanding technology during this time period and because of these demands telecommunications groups emerged within organizations, charged with the responsibility to maintain, evolve, and manage the network over a period of time.

The theme of the 1980s was database management systems (DBMSs). Organizations used and applied database technology in the 1970s, but in the 1980s they grew more confident in the application of DBMS technology. Because of the advances in network technology, the focus was now on the sharing of data across organizational and application boundaries. Curiously, database technology did not change the fundamental way in which business processing was done. DBMS made it more convenient to access the data and to ensure that it could be updated while maintaining the integrity of the data.

In the 1990s, technology began to shift toward client/server computing. Client/server computing is a style of computing involving multiple processors, one of which is typically a workstation, and across which a single business transaction is completed. Using the workstation, the transaction entered by the user could now be processed on a keystroke-by-keystroke basis.

Furthermore, there was a change in the communications. With client/server, users could communicate with others in the work group via a local area network (LAN). The LAN permitted workstation-to-workstation communications at speeds of 100 to 1,000 times what was typically available on a WAN. The LAN was a technology that could be grown and evolved in a local office with little need for direct interaction from the telecommunications group.

During the late 1990s, the Internet began to receive widespread use by consumers and businesses. In the business world, the Internet has caused the concept of business users to expand greatly because of the way in which computers are now capable of being interconnected. In addition, the cost of computers has dropped to the point that it is affordable for almost every household to own a computer if they so desire. As such, a need to expand the reach of computing both within and outside the enterprise, and that enables the sharing of data and content between individuals and applications has developed.

To that end, a great need exists amongst existing and newly created business enterprises for computing solutions that capture and take advantage of the advantages and capabilities provided by the Internet.

SUMMARY OF THE INVENTION

The present invention discloses an environment services architecture and a method of providing an environment services architecture that is part of a netcentric execution architecture used in a netcentric computing system. The environment services architecture includes runtime services for converting non-compiled computer languages into machine code during the execution of an application on the netcentric computing system. System services perform system level functions on the netcentric computing system that may be selected from the group consisting of system security services, profile management services, task and memory management services and environment verification services. Application services perform common functions in the netcentric computing system. The common functions may be selected from the group consisting of application security services, error handling/logging services, state management services, code table services, active help services, application integration services and common services.

A component framework service provides components of the netcentric computing system with a standard infrastructure for allowing an application running on components to communicate within and across applications in the netcentric computing system. Operating system services are provided for providing the netcentric computing system with underlying basic computing services. As set forth above, the preferred environment service architecture is designed to provide the netcentric computing system with miscellaneous application and system level services that do not deal directly with managing the user interface, communicating to other programs, or accessing data.

The runtime services include language interpreter services and virtual machine services. The language interpreter services decompose a scripting language into machine code at runtime. The virtual machine services include at least one virtual machine. In the preferred embodiment, the virtual machine services provide a layer of abstraction between applications and the underlying operating system and are used to support operating system independence.

As previously set forth, the system services include system security services, profile management services, environment verification services and task and memory management services. The system security services provide applications with the ability to interact with native security mechanisms that are used by an operating system on the netcentric computing system. The profile management services are used to access and update a plurality of user or application profiles. The environment verification services monitor, identify and validate application integrity before applications are executed on the netcentric computing system. The task and memory management services allow applications or events to control individual computing tasks or processes and manage memory resources in the netcentric computing system.

As set forth above, the application services include application security services, error handling/logging services, state management services, codes table services, active help services, file services, application integration services and other common services. The application security services may be selected from the group consisting of user access services, data access services and function access services. The error handling/logging services present users of the netcentric computing system with an explanation of errors and logs error events in a database. The state management services enable information to be shared between windows, web pages and applications in said netcentric computing system.

The codes table services enable applications or a client to use externally stored parameters and validation rules on the netcentric computing system. The active help services enable applications to provide assistance to a user or a client for a specific task in said netcentric computing system. The file services enable applications to use, manage and write to files that are located in the netcentric computing system. The application integration interface services provide a gateway for passing context and control of information to an external application. The common services provide a plurality of reusable routines that may be used across a set of applications in said netcentric computing systems.

Further objects and advantages of the present invention will be apparent from the following description, reference being made to the accompanying drawings wherein preferred embodiments of the present invention are clearly shown.

DETAILED DESCRIPTION OF THE PRESENTLY PREFERRED EMBODIMENTS OF THE INVENTION

Figure 1:
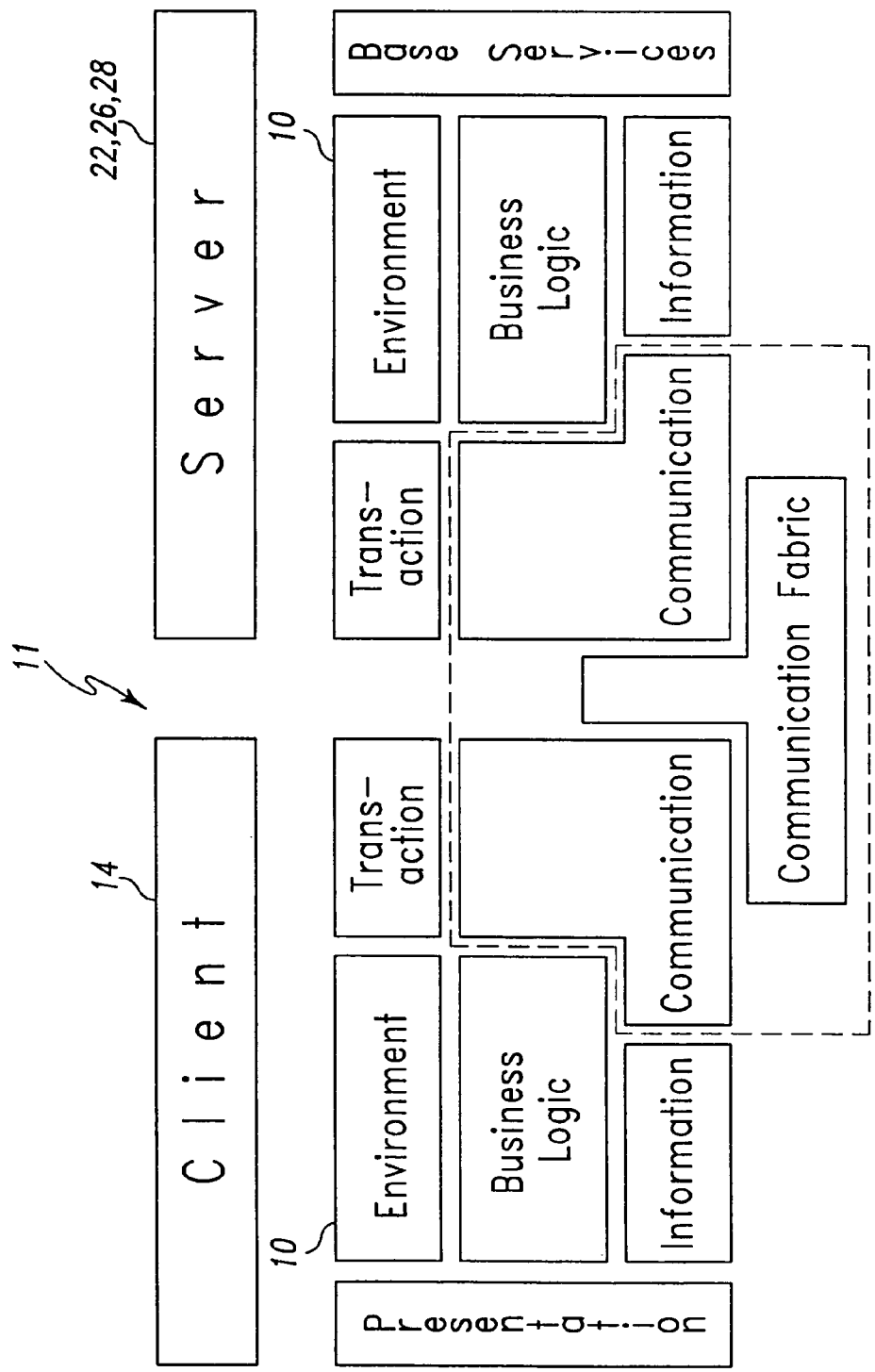
FIG. 1 illustrates a netcentric execution architecture for a netcentric computing system that includes a environment services architecture.
Figure 2:
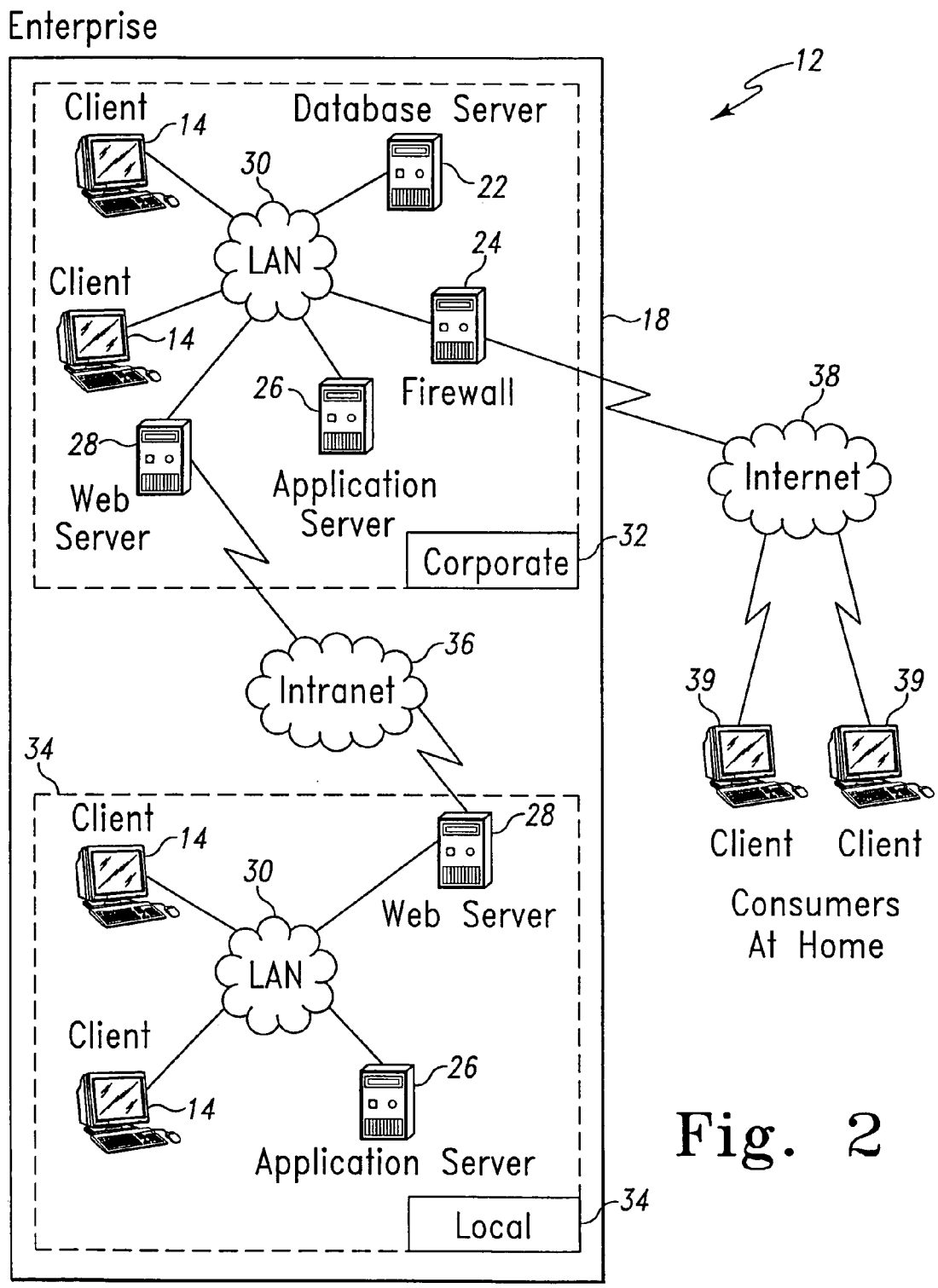
FIG. 2 illustrates a representative illustration of a netcentric computing system.

Referring to FIGS. 1 and 2, the present invention discloses an environment services architecture 10 that is preferentially used in a netcentric execution architecture 11 of a netcentric computing system 12. The physical picture of an illustrative netcentric computing system 12 is illustrated in FIG. 2. In this example, a business enterprise 18 includes at least one client 14, at least one database server 22, at least one firewall 24, at least one application server 26, at least one web server 28 and a local area network (LAN) connection 30, which are electrically connected as illustrated in FIG. 2 to form a network.

As known in the art, LAN connections 30 are comprised of software and various other devices that are used to interconnect various components or computing devices that are located at a first enterprise location 32 within the much larger business enterprise 18. The term LAN connection, as used herein, should be broadly construed to hardware and software that allows clients 14 and servers 22, 26, 28 to be connected together to share data and files as well as the resources available on the netcentric computing system 12. Those skilled in the art would recognize that several components, such as network cards and cabling, may be required to create the LAN connection 30. In addition, those skilled in the art would recognize that various types of LAN connections 30 exist and may be used in the present invention.

For the purpose of the present invention, the firewall 24 is used to isolate internal systems from unwanted intruders. As known in the art, firewalls 24 isolate web servers 28 from all Internet traffic that is not relevant to the netcentric computing system 12. In the preferred embodiment, the only requests allowed through the firewall 24 are for services located on the web servers 28. All requests for other applications (e.g., FTP, Telnet) and other IP addresses are typically blocked by the firewall 24 during operation of the netcentric computing system 12.

The web servers 28 are the primary interface to the clients 14 for all interactions with the applications or services that are provided by the netcentric computing system 12. The main task of the web servers 28 is to authenticate the clients 14, establish a secure connection from the clients 14 to the web servers 28 using encrypted messages, and allow applications the clients 14 are using to transparently access the resources of the netcentric computing system 12. The web servers 28 are responsible for accepting incoming HTTP (Hyper-Text Transfer Protocol) messages and fulfilling the requests. For dynamic HTML (Hyper-Text Markup Language) page generation, requests are forwarded to the application servers 26. During operation, static pages, such as help pages, are preferably generated entirely by the web servers 28. The term client should be construed herein to include remote clients and local clients, unless otherwise specified, as set forth in detail below.

In the preferred embodiment, the primary function of the application servers 26 is to provide a link through which the web servers 28 can interact with the clients 14, trigger business transactions, and send back resulting data to the clients 14. A fundamental role of the application servers 26 is to manage the logical flow of transactions and keep track of the state of sessions. The application servers 26 are also responsible for managing all sessions within the netcentric computing system 12. A session is a period of time in which a client 14 is interacting with, and using, a resource of the netcentric computing system 12, preferentially by accessing the resources through a web browser that is connected with the web server 28.

In the preferred embodiment of the present invention, the main purpose of the database servers 22 is to handle an application log. All requests sent to the web servers 28 and application servers 26, as well as their respective responses, are logged in the application log. The application log is preferentially used for traceability. In the preferred embodiment, requests are logged in the application log directly by the application server 26. Those skilled in the art would recognize that any number of data items can be monitored and kept track of in the application log.

As further illustrated in FIG. 2, a second business enterprise location 34 may be connected with the first business enterprise location 32 using an intranet connection 36. Those skilled in the art would recognize that various intranet connections 36 exist and may be used in the present invention. The intranet connection 36 allows the computing resources of the second business enterprise location 34 to be shared or connected with the computing resources available at the first business enterprise location 32. The term intranet connection, as used herein, should be broadly construed to include software and hardware that is used to connect one server at business location with another server at another business location. Although not illustrated, several other enterprise locations, each containing its own computing resources, may be connected with the netcentric computing system 12.

In the preferred embodiment illustrated in FIG. 2, the firewall 24 of the first business enterprise location 32 is connected with an Internet connection 38 to a plurality of remote clients 39. Preferentially, the remote clients 39 that are connected to the Internet connection 38 access data and resources at the business enterprise 18 by using the Internet connection 38 and a web browser located on the remote client 39. The Internet connection 38 gives the remote clients 39 the ability to gain access to applications, information and data that may be located on the database server 22, the application server 26 and the web server 28. The difference between a "remote" client 39 and a traditional client 14 is that the remote client 39 accesses data and resources of the netcentric computing system 12 only through an Internet connection 38 and not a LAN connection 30 or a intranet connection 36. This allows users on remote clients 39 to access the resources of the netcentric computing system 12 from remote geographic locations anytime, anywhere (such as, at home, a friends house, laptops in hotels, kiosks, library terminals, etc.).

Those skilled in the art would recognize that several methods and devices may be used to provide an Internet connection 38 to the netcentric computing system 12. In addition, those skilled in the art would recognize that various devices (e.g. —modems, cable modems, etc.) and sub-services (such as Internet Service Providers) may be used to provide remote clients 39 with the Internet connection 38. As used herein, the term Internet connection 38 should be broadly construed to include the hardware and software that enables remote clients 39 and servers 22, 26, 28 to connect with, and communicate on the global information network commonly known as the Internet.

Referring to FIG. 1, for a detailed discussion of the other elements of the preferred netcentric execution architecture 11, as well as netcentric computing systems 12, refer to co-pending U.S. patent application Ser. No. 09/676,227 entitled ARCHITECTURES FOR NETCENTRIC COMPUTING SYSTEMS, which was filed on Sep. 29, 2000 and is hereby incorporated by reference, in its entirety.

Figure 3:
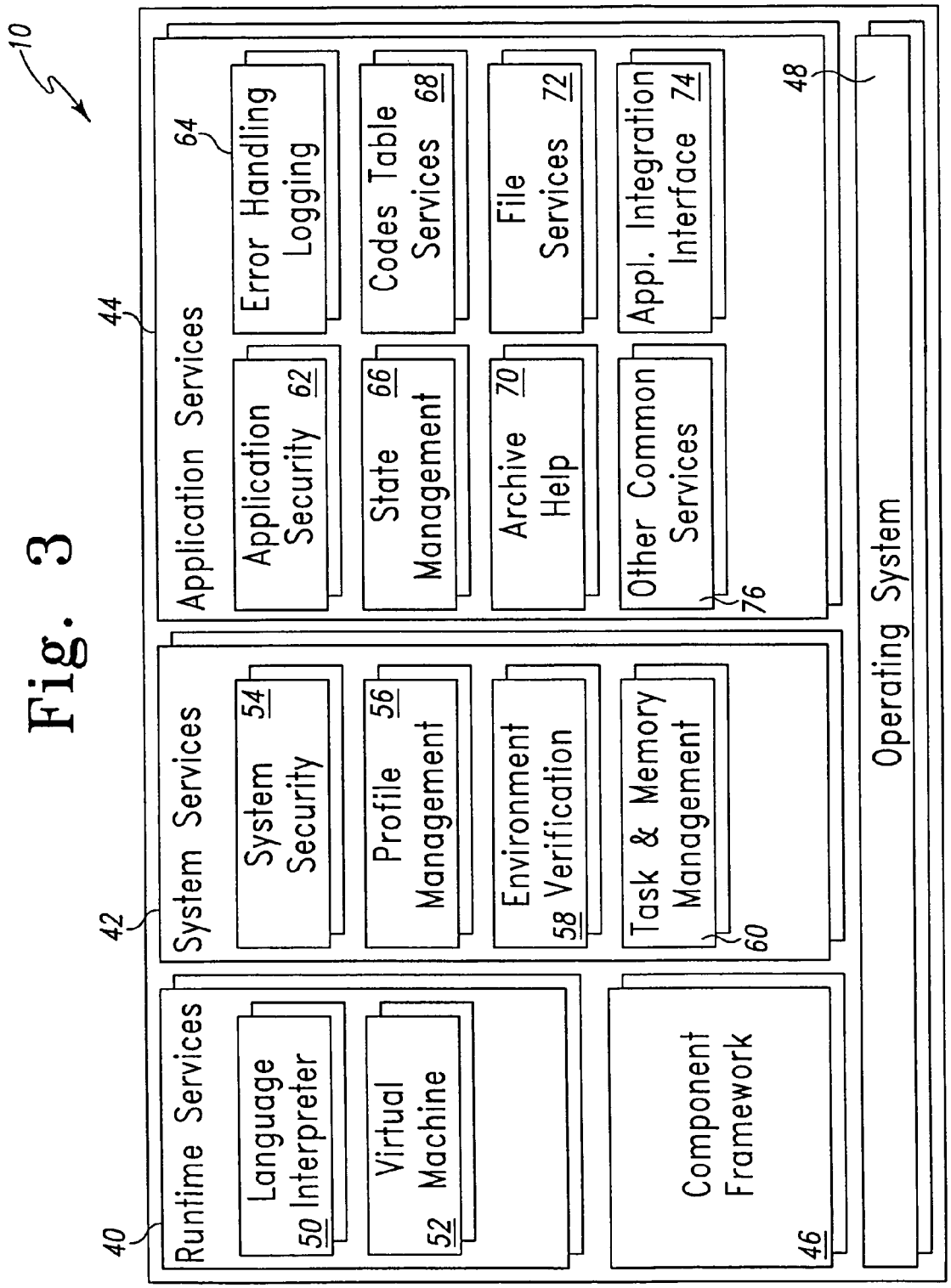
FIG. 3 illustrates an environment services architecture for a netcentric computing system.

Referring to FIGS. 1 and 3, the present invention discloses an environment services architecture 10 for a netcentric execution architecture 11 that is used in a netcentric computing system 12. As illustrated in FIG. 3, the preferred environment services architecture 10 includes runtime services 40, system services 42, application services 44, component framework services 46 and operating system services 48. As set forth below, the environment services architecture 10 provides services to the netcentric computing system 12 that allows the netcentric computing system 12 to operate optimally to provide business solutions to various enterprises desiring an Internet based solution. The environment services architecture 10 provides miscellaneous application and system level services to the netcentric computing system 12 that do not deal directly with managing the user interface on the clients 14, communicating to other applications, or accessing data in the netcentric computing system 12.

In the preferred embodiment of the present invention, the runtime services 40 are used to convert non-compiled computer languages into machine code during the execution of an application within the netcentric computing system 12. Two sub-services comprise the preferred runtime services 40, which are language interpreter services 50 and virtual machine services 52. The language interpreter services 50 decompose a fourth-generation and/or a scripting language into machine code (executable code) at runtime. The virtual machine services 52 provide virtual machines (VM) to the netcentric computing system 12, which as known in the art are implemented in software on top of an operating system and are used to run applications. The virtual machine services 52 provide a layer of abstraction between applications and the underlying operating system on the client 14 or server 22, 26, 28 and are often used to support operating system independence.

The system services 42 are applications that are used to perform system-level functions in the netcentric computing system. As illustrated in FIG. 3, in the preferred embodiment the system services 42 preferentially include system security services 54, profile management services 56, task and memory management services 58 and environment verification services 60. The system security services 54 allow applications to interact with an operating system's native security mechanisms. The operating system's native security mechanisms include basic services that include the ability to log in, log off, authenticate to the operating system and enforce access control to system resources and executables. As known in the art, several basic services, as defined herein, are provided by commonly used operating systems manufacturers that can provide various levels of security to clients 14, 39 and servers 22, 26, 28.

The profile management services 56 of the systems services 42 are used to access and update local or remote clients 14, 39 user or application profiles by the netcentric computing system 12. User profiles, for example, can be used to store a variety of information, from the user's language and color preferences to basic job function information. This information may be used and shared with other services in the netcentric computing system 12 as well. Those skilled in the art would recognize that several types of information may be stored and located in user profiles.

The environment verification services 58 ensure functionality by monitoring, identifying and validating environment integrity prior to and during the execution of an application (e.g., free disk space, monitor resolution and correct version) in the netcentric computing system 12. The environment verification services 58 are invoked when an application begins processing or when a component is called. Applications can use the environment verification services 58 to verify that the correct versions of the required netcentric execution architecture 11 components and other application components are available. In some client 14, 39/server 22, 26, 28 applications, it may be necessary to implement the environment verification services 58 to ensure that the client 14, 39 and server 22, 26, 28 applications are of a compatible release level before continuing.

ActiveX frameworks can be included in the netcentric computing system 12 for providing services for automatic installation and upgrade of ActiveX controls. Internet Explorer, Microsoft's web browser, is integrated with Windows OS, so ActiveX controls can be automatically installed and automatically upgraded on the clients 14, 39 without the developer adding any additional code. This service may be used in the netcentric computing system 12 to upgrade and ensure that applications being provided by the servers 22, 26, 28 can run properly on the clients 14, 39.

In the preferred embodiment, the task and memory management services 60 are provided for allowing applications and/or other events in the netcentric computing system 12 to control individual computer tasks or processes and manage memory. The task and memory management services 60 provide applications for scheduling, starting, stopping and restarting both client 14, 39 and server 22, 26, 28 tasks (e.g., software agents). Memory management, the allocating and freeing of system resources, is one of the more error-prone development activities when using 3GL development tools. Using task and memory management services 60 for memory-handling functions reduces the frequency of errors, which are difficult to debug. Those skilled in the art would recognize that task and memory handling applications will vary from system to system, depending on the needs and requirements of each particular netcentric computing system 12.

The application services 44 include applications that perform common functions within the netcentric computing system 12. The application services 44 use applications that provide functions that can apply to one application or across multiple applications. As illustrated in FIG. 3, in the preferred embodiment of the present invention, the application services 44 preferentially include application security services 62, error handling/logging services 64, state management services 66, code table services 68, active help services 70, file services 72, application integration interface services 74 and other common services 76. Each of the above-referenced services is discussed in detail below.

As set forth in FIG. 3, the preferred application services 44 include application security services 62. In addition to the system security services 54, such as logging into a network (typically provided in LAN connection cases), the environment services architecture 10 there are also application security services 62 associated with specific applications on the clients 14, 39 and servers 22, 26, 28 that include user access services, data access services and function access services. User access services provide a set of common functions that limits application access to specific users within a company or external customers. Data access services provide a set of common functions that limits access to specific data within an application to specific users or user types (e.g., secretary, manager). Function access services provide a set of common functions that limits access to specific functions within an application to specific users or user types (e.g., secretary, manager).

In netcentric computing systems 10 application security becomes more critical because there are more types of users (e.g., employees and customers) and additional types of transactions (e.g., e-Commerce and help desks). In traditional client/server environments, most users of the companies computing systems are employees of the company. In netcentric computing systems 10, there are also external users (e.g., vendors and registered users) and the general public, which may access the netcentric computing system 12 from a variety of remote clients 39 located in vast geographic locations. Different types of users can be given different application security requirements limiting what data they can see and what functions they can execute in the netcentric computing system. Also, new types of transactions, such as verifying credit when doing e-Commerce transactions, also require additional application security services.

The error handling/logging services 64 support the handling of fatal and nonfatal hardware and software errors for an application in the netcentric computing system 12. The error handling/logging services 64 present users on clients 14, 39 with an understandable explanation of what has happened and coordinating with other services to ensure that transactions and data are restored to a consistent state. In addition, the error handling/logging services 64 support the logging of informational, error and warning messages. Logging services record application and user activities in enough detail to satisfy any audit trail requirements or to assist the systems support team in recreating the sequence of events that led to an error.

Primarily, there are three types of errors: system, architecture and application. System errors occur when the application is being executed and some kind of serious system-level incompatibility is encountered, as a result of which the application cannot proceed with its normal execution. These errors can result from such things as memory/resource depletion, database access problems, network problems or printer-related problems.

Architecture errors are those that occur during the normal execution of the application. They are generated in architecture functions that are built by a project architecture team to isolate the developers from complex coding, to streamline the development effort by reusing common services. These architecture functions perform services such as database calls and state management.

Application errors are also those that occur during the normal execution of the application. They are generally related to business logic errors such as invalid date, invalid price and so forth. Typically, an application is written using a combination of various programming languages (e.g., Visual Basic and C). Therefore, a common error-handling routine should be written in a language that can be called from any other language used in the application.

Logging must also be done, however, to mitigate problems, centralize logs and create a standard, usable log format. Third-party logs should be mapped into the central format before any analysis is attempted. In netcentric computing systems 10, errors are rarely logged on the client 14, 39 (although an exception may be for an intranet-type application) and are virtually always logged on the servers 22, 26, 28. Logging can add a great deal of stress to a web server 28 and log files can quickly grow very large. Consequently, system administrators should not plan to log all errors, but, instead, only those deemed necessary for processing exceptions.

The state management services 66 enable information to be passed or shared among windows and web pages and/or across applications in the netcentric computing system 12. For example, suppose that several fields in an application need to be passed from one window to another window on the client's 14, 39 desktop. In pseudo-conversation mainframe 3270-style applications, passing data from one screen to another screen was done using context management services, which provided the ability to store information on a host computer (here, the term "context management" refers to storing state information on the server, not the client). Client/server architectures simplified or eliminated the need for context management (storing state information on the server) and created a need to store state information on the client. In the netcentric computing system 12, this type of state management (i.e., data sharing) is preferentially done on the client 14, 39 using hidden fields, global variables, messages, files or local databases.

The popularity of the Internet's HTTP protocol has revived the need for implementing some form of context management services (storing state information on the web server 28). The HTTP protocol is a stateless protocol. Every connection is negotiated from scratch, not just at the page level, but for every element on the page. In the preferred netcentric computing system 12, the web server 28 does not maintain a session connection with the client 14, 39 nor save any information between exchanges of information (i.e., web page submits or requests) with the clients 14, 39. Each HTTP exchange is a completely independent event. Therefore, information entered into one HTML form must be saved by the associated server application somewhere where it can be accessed by subsequent programs in a conversation. The preferred state management services 66 implement state management on both the client 14, 39 and servers 22, 26, 28 in the environment services architecture 10.

The codes table services 68 enable applications on clients 14, 39 to utilize externally stored parameters and validation rules in the netcentric computing system 12. For example, an application may be designed to retrieve the tax rate for the state of Illinois. When the user enters "Illinois" on the screen, the application first validates the user's entry by checking for its existence on the "State Tax Table" and then retrieves the tax rate for Illinois from the web server 28. Note that codes tables provide an additional degree of flexibility. If the tax rates change, the data simply needs to be updated on the web server 28; no application logic needs to be modified.

In situations where an application requires extensive use of codes tables, the codes table services 68 provides the application developers with a set of APIs that can be used to create code/decode tables. This component also provides the option of caching all or parts of the codes table in the application memory on the client 14, 39 for easier and faster access in the future. Code/decode information can be stored at any layer of an n-tier architecture-client 14, 39 databases or server 22, 26, 28 databases. The decision needs to be based upon codes table size and number, information update frequency and write access to the client 14, 39.

The active help services 70 enable an application to provide assistance to a user for a specific task or set of tasks. Context-sensitive help is preferentially used in applications of the netcentric computing system 12; however, this can imply more active support than just hitting the F1 key for example. Preferentially, each active help service application that is located in the active help services 70 is designed to include help that is aware of the user's environment, process and context; in this sense, it can be called "active." The preferred active help services 70 may include components such as wizards (which walk users through a new process), stored or real-time multimedia support and on-demand computer-based training.

The file services 72 enable applications to use, manage, and write to files that may be located on a variety of platforms in a variety of locations within the netcentric computing system 12. File services 72 give clients 14, 39 remote access to files as if they were located locally, thereby providing transparent access to files for the client 14, 39. Those skilled in the art would recognize that the file services 72 will vary from enterprise to enterprise, depending on the needs and requirements of the particular netcentric computer system 12.

The application integration interface services 74 provide a method or gateway for passing context and control of information to an external application in the netcentric computing system 12. The application integration interface services 74 specify how information will be passed, which is typically from the web server 28 to the client 14, 39, and defines the interface by which other applications can expect to receive information. External applications in this context could include anything from integrated performance support systems to ERP systems such as SAP or Peoplesoft, to external custom applications that have been previously developed. Where possible, application integration interfaces services 74 should make use of the component model defined by the project to broker information (i.e., OLE/COM interfaces) as opposed to custom building data-sharing modules. Those skilled in the art would recognize that various application integration interface services 74 may be readily incorporated and used in the preferred environment services architecture 10.

The common services 76 component of the application services 44 is a catchall category for a plurality of reusable routines that are useful across a set of applications that may be used in the netcentric computing system 12. Some examples of common services include date routines, time zone conversions and field validation routines. The examples set forth above have been set forth for illustrative purposes only and should not be construed as a limitation of the present invention. Those skilled in the art would recognize that several common services 76 exist and may be used in the application services 44 of the environment services architecture 10.

The component framework services 46 provide a standard infrastructure for building components so that they can communicate within an application and across applications, on the same machine (i.e. —client 14, 39 or server 22, 26, 28) or on multiple machines across a network, to work together. COM/DCOM and CORBA are the two leading component industry standards. These standards define how components should be built and how they should communicate and interact with each other.

Object Request Broker (ORB) services, based on COM/DCOM and CORBA, focus on how components communicate. The preferred component framework services 42, which are preferentially also based on CORBA and COM/DCOM, focus on how components should be built. Currently, two of the most dominant component frameworks include active X/OLE and JavaBeans.

Active X and Object Linking and Embedding (OLE) are implementations of COM/DCOM. ActiveX is a collection of facilities forming a framework for components to work together and interact. ActiveX divides the world into two kinds of components: controls and containers. Controls are relatively independent components that present well-defined interfaces or methods that containers and other components can call. Containers implement the part of the ActiveX protocol that allows for them to host and interact with components, forming a kind of back plane into which controls can be plugged. ActiveX is a scaled-down version of OLE for the Internet.

OLE provides a framework to build applications from component modules and defines the way in which applications interact using data transfer, drag-and-drop and scripting. OLE is a set of common services that allows components to collaborate intelligently. In creating ActiveX from OLE2.0, Microsoft enhanced the framework to address some of the special needs of web-style computing. Microsoft's web browser, Internet Explorer, is an ActiveX container. Therefore, any ActiveX control can be downloaded to, and plugged into, the browser. This allows for executable components to be interleaved with HTML content and downloaded as needed by the web browser.

JavaBeans is Sun Microsystems' proposed framework for building Java components and containers. The intent is to develop and API standard that will allow components developed in Java (or beans), to be embedded in completing container frameworks including ActiveX or OpenDoc. JavaBeans API makes it easier to create reusable components in the Java language.

Other component frameworks include OpenDoc and One. CI Labs, formed in 1993, created the OpenDoc architecture to provide a cross-platform alternative component framework, independent of Microsoft's OLE. The OpenDoc architecture is constructed from various technologies supplied by its founding members: IBM, Apple and Word Perfect. The technologies include Bento (Apple's object storage model), Open Scripting Architecture (OSA-Apple's scripting architecture) and SOM/DSOM (IBM's System Object Model/Distributed SOM). IBM's SOM architecture provides analogous services to that of Microsoft's DCOM architecture.

OpenDoc provides an open compound document infrastructure based on CORBA. It uses CORBA as its object model for inter-component communications. OpenDoc architecture provides services analogous to those provided by OLE, and OpenDoc components can also interoperate with OLE components. The OpenDoc equivalent of an object is termed a "part." Each type of part has its own editor, and the OpenDoc architecture has responsibility for handling the communications between the distinct parts.

Open Network Environment (ONE) is an object-oriented software framework from Netscape Communications for use with Internet clients and servers. It enables the integrating of web clients and servers with other enterprise resources and data. By supporting CORBA, ONE-enabled systems will be able to link with object software from a wide array of vendors, including IBM, Sun Microsystems, Digital Equipment and Hewlett-Packard. Netscape is positioning ONE as an alternative to Microsoft's Distributed Common Object Model (DCOM). ONE also complies with Sun Microsystems' Java technology.

The operating system services 48 are the underlying services—such as multi-tasking, paging and memory allocation—that are typically provided by today's modern operating systems. As known in the art, the operating system services 48 are typically used by clients 14, 39 to perform basic computing tasks such as providing a desktop and web browser applications that allow clients 14, 39 to connect to the web servers 28. The operating system services 48 provide the clients 14, 39 and servers 22, 26, 28 of the netcentric computing system 12 with underlying basic computing services. Where necessary, an additional layer of APIs may be provided to gain either operating system independence or a higher level of abstraction for application programmers. Those skilled in the art would recognize that various operating system services 48 exist and may be used in the preferred environment services architecture 10 to provide basic underlying computing capabilities to the netcentric computing system 12.

While the invention has been described in its currently best known modes of operation and embodiments, other modes and embodiments of the invention will be apparent to those skilled in the art and are contemplated. For other features, advantages and combinations of the present invention refer to U.S. Provisional Application Ser. No. 60/156,962, entitled NETCENTRIC AND CLIENT/SERVER COMPUTING, which is herein incorporated by reference, in its entirety.

What is claimed is:

1. An environment services architecture for a netcentric computing system, comprising:
   a computer; and
   a memory in communication with the computer, the memory including runtime services executable on the computer to convert non-compiled computer languages into machine code during the execution of an application on said netcentric computing system;
   the memory including system services executable on the computer to perform system-level functions that are selected from the group consisting of system security services, profile management services, task and memory management services and environment verification services;
   the memory including application services executable on a computer to perform common functions in said netcentric computing system, wherein said common functions include first services and second services,
   wherein said first services are selected from the group consisting of application security services, error handling/logging services, state management services, active help services and common services, and
   wherein said second services are application integration interface services that are executable on the computer to pass context and control of information to an application in said netcentric computing system that is external to said application services, said application integration interface services further executable on the computer to specify a communication path for passing information to said application external to said application services, and define an interface by which other applications can expect to receive information from said application external to said application services;
   a component framework service executable on the computer to provide components of said netcentric computing system with a standard infrastructure for allowing an application running on components to communicate within and across applications in said netcentric computing system; and
   operating system services executable on the computer to provide said netcentric computing system with underlying basic computing services.

2. The environment services architecture of claim 1, wherein said runtime services include language interpreter services and virtual machine services.

3. The environment services architecture of claim 2, wherein said language interpreter services are executable with the computer to decompose a scripting language into machine code at runtime.

4. The environment services architecture of claim 2, wherein said virtual machine services include at least one virtual machine.

5. The environment services architecture of claim 1, wherein said system security services are executable with the computer to provide applications with the ability to interact with native security mechanisms that are used by an operating system on said netcentric computing system.

6. The environment services architecture of claim 1, wherein said profile management services are used to access and update a plurality of user or application profiles.

7. The environment services architecture of claim 1, wherein said environment verification services are executable with the computer to monitor, identify and validate application integrity before said application is executed on said netcentric computing system.

8. The environment services architecture of claim 1, wherein said task and memory management services are executable with the computer to allow applications or events to control individual computing tasks or processes and to manage memory resources in said netcentric computing system.

9. The environment services architecture of claim 1, wherein said application security services are selected from the group consisting of user access services, data access services and function access services.

10. The environment services architecture of claim 1, wherein said error handling/logging services are executable with the computer to present users of said netcentric computing system with an explanation of errors and log error events in a database.

11. The environment services architecture of claim 1, wherein said state management services are executable with the computer to enable information to be shared between windows, web pages and applications in said netcentric computing system.

12. The environment services architecture of claim 1, wherein said active help services are executable with the computer to enable applications to provide assistance to a user or a client for a specific task in said netcentric computing system.

13. The environment services architecture of claim 1, wherein said file services are executable with the computer to enable applications to use, manage and write to files that are located in said netcentric computing system.

14. The environment services architecture of claim 1, wherein said common services are executable with the computer to provide a plurality of reusable routines that may be used across a set of applications in said netcentric computing systems.

15. The environment services architecture of claim 1, wherein said common functions further include third services that are codes table services, said codes table services are configurable and executable with the computer to enable applications operable in a remote client to access and use at least one of parameters or validation rules that are stored external to said remote client.

16. The environment services architecture of claim 15, wherein said codes table services are configurable to create a code table from said at least one of parameters or rules, and are executable with the computer to cache a code table in a memory in said remote client to improve access efficiency.

17. A method of providing an environment services architecture for a netcentric computing system, comprising the steps of:
converting non-compiled computer languages into machine code during the execution of an application on said netcentric computing system with at least one runtime service located on a client and a server;
performing system-level functions on said netcentric computing system with at least one system service located on said client and said server, wherein said system services are selected from the group consisting of system security services, profile management services, task and memory management services and environment verification;
performing common functions in said netcentric computing system with common services located on said client and said server,
wherein first common services are selected from the group consisting of application security services, error handling/logging services, state management services, active help services and common services;
enabling an application on a remote client to access externally stored parameters and validation rules in said netcentric computing system with second common services that are codes table services;
selectively caching in application related memory on said remote client at least a portion of a code table created using said codes table services, wherein said code table is created from said externally stored parameters and validation rules that are accessed using said codes table services;
passing context and control of information to an external application in said netcentric computing system with third common services that are application integration interface services, wherein said external application is external to said remote client;
using component framework services located on said client and said server for providing a standard infrastructure for components to communicate within and across applications in said netcentric computing system; and
providing basic computing system services to said client and said server with operating system services.

18. The method of claim 17, wherein said runtime services include language interpreter services and virtual machine services.

19. The method of claim 18, wherein said language interpreter services decompose a scripting language into machine code at runtime.

20. The method of claim 18, wherein said virtual machine services include at least one virtual machine.

21. The method of claim 17, wherein said system security services provide applications with the ability to interact with native security mechanisms that are used by an operating system on said netcentric computing system.

22. The method of claim 17, wherein said profile management services are used to access and update a plurality of user or application profiles.

23. The method of claim 17, wherein said environment verification services monitor, identify and validate application integrity before an application is executed on said netcentric computing system.

24. The method of claim 17, wherein said task and memory management services allow applications or events to control individual computing tasks or processes and manage memory resources in said netcentric computing system.

25. The method of claim 17, wherein said application security services are selected from the group consisting of user access services, data access services and function access services.

26. The method of claim 17, wherein said error handling/logging services present users of said netcentric computing system with an explanation of errors and logs error events in a database.

27. The method of claim 17, wherein said state management services enable information to be shared between windows, web pages and applications in said netcentric computing system.

28. The method of claim 17, wherein said active help services enable applications to provide assistance to a user or a client for a specific task in said netcentric computing system.

29. The method of claim 17, wherein said file services enable applications to use, manage and write to files that are located in said netcentric computing system.

30. The method of claim 17, wherein said common services provide a plurality of reusable routines that may be used across a set of applications in said netcentric computing system.

31. The method of claim 17, wherein passing context and control of information comprises specifying with said application integration interface services the communication path over which the information will be passed, and defining with said application integration interface services the interface by which other applications can expect to receive information from said external application.

32. An environment services architecture for a netcentric computing system, comprising:
 at least one web server connected with a remote client;
 wherein said client and said web server include runtime services, system services, application services, a component framework service and operating system services,
 wherein said application services include codes table services and application integration interface services,
 said codes table services are configured to enable applications on said remote client to use parameters and validation rules stored in said netcentric computing system external to said web server and said remote client, and
 said application integration interface services are configured to provide a gateway to pass context and control of information to an application in said netcentric computing system that is external to said web server and said remote client.

33. The environment services architecture of claim 32, wherein said runtime services convert non-compiled computer languages into machine code during the execution of an application on said netcentric computing system.

34. The environment services architecture of claim 32, wherein said system services perform system-level functions that are selected from the group consisting of system security services, profile management services, task and memory management services and environment verification services on said netcentric computing system.

35. The environment services architecture of claim 32, wherein said application services also perform other common functions in said netcentric computing system, wherein said other common functions are selected from the group consisting of application security services, error handling/logging services, state management services, active help services and common services.

36. The environment services architecture of claim 32, wherein said component framework service provides components of said netcentric computing system with a standard infrastructure for allowing an application running on components to communicate within and across applications in said netcentric computing system.

37. The environment services architecture of claim 32, wherein said operating system services provide said netcentric computing system with underlying basic computing services.

38. The environment services architecture of claim 32, wherein said application integration interface services are further configured to specify a communication path by which information will be passed.

39. The environment services architecture of claim 32, wherein said application integration interface services are further configured to define the interface by which other applications can expect to receive information from said application external to said web server and said remote client.

40. The environment services architecture of claim 32, wherein said codes table services are further configured to enable selective caching in a memory of said remote client at least a portion of a code table to be created by said codes table services using said parameters and validations rules.

41. The environment services architecture of claim 40, wherein said codes table services is configured with a plurality APIs that are useable to create a code/decode table.

42. The environment services architecture of claim 32, wherein said application in said netcentric computing system that is external to said web server and said remote client comprises at least one of an integrated performance support system, an ERP system or a custom application, or combinations thereof.

* * * * *

UNITED STATES PATENT AND TRADEMARK OFFICE
CERTIFICATE OF CORRECTION

PATENT NO. : 7,734,687 B2 Page 1 of 1
APPLICATION NO. : 11/208491
DATED : June 8, 2010
INVENTOR(S) : Scott R. Sargeant It is certified that error appears in the above-identified patent and that said Letters Patent is hereby corrected as shown below:

Page 3, line 21 in the References Cited - Other Publications:

After "Morris, K.C. and Flater, D., 'Standards-based software testing in a Net-Centric World' pp. 1-8.", please insert --Software Technology and Engineering Practice, 1999, STEP '99 Proceedings, September 1, 1999.--

Page 3, line 55 in the References Cited - Other Publications:

After "Litoiu, et al., 'A performance engineering tool and method for distributed applications', ACM, pp. 1-14.", please insert --published 1997.--

Signed and Sealed this

Tenth Day of August, 2010

David J. Kappos
*Director of the United States Patent and Trademark Office*